US009339815B2

(12) United States Patent

Kim et al.

(10) Patent No.: US 9,339,815 B2

(45) Date of Patent: May 17, 2016

(54) DIAGNOSTIC CARTRIDGE AND CONTROL METHOD FOR DIAGNOSTIC CARTRIDGE

(75) Inventors: Ji Tae Kim, Seoul (KR); Guei Sam Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1010 days.

(21) Appl. No.: 13/346,327

(22) Filed: Jan. 9, 2012

(65) Prior Publication Data

US 2012/0178179 A1 Jul. 12, 2012

(30) Foreign Application Priority Data

Jan. 10, 2011 (KR) ........................ 10-2011-0002287
May 11, 2011 (KR) ........................ 10-2011-0044217

(51) Int. Cl.

| | |
|---|---|
| ***G01N 1/00*** | (2006.01) |
| ***B01L 3/00*** | (2006.01) |
| ***G01N 27/00*** | (2006.01) |

(52) U.S. Cl.

CPC ....... *B01L 3/50273* (2013.01); *B01L 3/502738* (2013.01); *B01L 2200/027* (2013.01); *B01L 2200/04* (2013.01); *B01L 2200/0684* (2013.01); *B01L 2200/10* (2013.01); *B01L 2200/146* (2013.01); *B01L 2200/147* (2013.01); *B01L 2300/044* (2013.01); *B01L 2300/069* (2013.01); *B01L 2300/0645* (2013.01); *B01L 2300/0672* (2013.01); *B01L 2300/0819* (2013.01); *B01L 2300/0867* (2013.01); *B01L 2300/161* (2013.01); *B01L 2300/18* (2013.01); *B01L 2400/049* (2013.01); *B01L 2400/0487* (2013.01); *B01L 2400/0688* (2013.01); *Y10T 436/2575* (2015.01)

(58) Field of Classification Search

CPC ...................... B01L 3/502738; B01L 3/50273; B01L 3/502715; B01L 2300/044; B01L 2300/069; B01L 2300/0672; B01L 2300/161; B01L 2300/18; B01L 2300/0867; B01L 2300/0819; B01L 2300/0645; B01L 2200/027; B01L 2200/0684; B01L 2200/146; B01L 2200/10; B01L 2200/04; B01L 2200/147; B01L 2400/0688; B01L 2400/0487; B01L 2400/049; Y10T 436/2575

See application file for complete search history.

(56) References Cited

U.S. PATENT DOCUMENTS

| | | | | |
|---|---|---|---|---|
| 5,147,781 | A * | 9/1992 | Rishpon et al. | 205/777.5 |
| 5,624,850 | A * | 4/1997 | Kumar et al. | 436/527 |
| 2004/0166031 | A1 | 8/2004 | Taylor et al. | |
| 2008/0014576 | A1* | 1/2008 | Jovanovich et al. | 435/5 |
| 2008/0200343 | A1* | 8/2008 | Clemens et al. | 506/9 |
| 2009/0047713 | A1 | 2/2009 | Handique | |
| 2009/0162864 | A1 | 6/2009 | Kitazawa et al. | |
| 2009/0181411 | A1* | 7/2009 | Battrell et al. | 435/7.92 |
| 2009/0185955 | A1 | 7/2009 | Nellissen | |
| 2010/0105065 | A1 | 4/2010 | Webster et al. | |
| 2011/0120562 | A1* | 5/2011 | Tan et al. | 137/1 |

* cited by examiner

*Primary Examiner* — Christopher A Hixson

(74) *Attorney, Agent, or Firm* — Birch, Stewart, Kolasch & Birch, LLP

(57) ABSTRACT

Discussed are a diagnostic cartridge and a control method for the diagnostic cartridge. The cartridge includes a sample port through which a sample is injected, a first chamber moving the sample injected from the sample port, a second chamber moving a substrate solution, a first membrane formed at a distal end of the first chamber to function as a valve for preventing other substances from being injected into the first chamber after the sample is completely moved, and a second membrane formed at a distal end of the second chamber to function as a valve for preventing other substances from being injected into the first chamber after the substrate solution is completely moved.

6 Claims, 13 Drawing Sheets

C: counter electrode, R: reference electrode,
W: working electrode, S: sensing electrode <Cross-section view>

<Cross-section view>

<Top view>

DIAGNOSTIC CARTRIDGE AND CONTROL METHOD FOR DIAGNOSTIC CARTRIDGE

Pursuant to 35 U.S.C.§119(a), this application claims the benefit of earlier filing date and right of priority to Korean Patent Application Nos. 10-2011-0002287 and 10-2011-0044217, filed on Jan. 10, 2011 and May 11, 2011, the contents of which is hereby incorporated by reference in their entirety.

BACKGROUND OF THE DISCLOSURE

1. Field

The teachings in accordance with the exemplary embodiments of this present invention generally relate to a diagnostic cartridge and a control method for diagnostic cartridge, and more particularly to a diagnostic cartridge mounted with a membrane having a valve function, and capable of providing a washing function through generation of air segment, and a control method for diagnostic cartridge.

2. Background

In the past, a patient had to visit a hospital whenever there is a need that requires a medical doctor's check-up or diagnosis. Nowadays, however, the patient can easily get a medical check-up at any place using a simple diagnostic cartridge. Researches for the diagnostic cartridge have been briskly waged to a direction to reduce a user inconvenience and to enhance accuracy.

A variety of structures for diagnostic cartridges has been developed for measuring samples and for mixing specimens. Generally, the structure is such that the samples and specimens are moved and mixed through a plurality of channels, and reaction therefrom is advised to a user. In this case, a method for effectively controlling the movement of samples and specimens is very important for adequate mixing the measurement samples and specimens.

Particularly, there is a difficulty in controlling movement of liquid due to unexpected force such as cohesiveness, because each size of channels is very small, and the samples and specimens are usually liquid. If the samples and specimens are reversely flown, checking cannot be properly performed, and chances are that a disposal diagnostic cartridge is discarded even without a checking.

In order to solve the aforementioned problems, attempts have been made to adjust pressure inside channels, but a comprehensive solution is yet to be found through adjustment of pressure inside the channels due to a complicated connection of channels inside the cartridge. Furthermore, only air pressure is not sufficient enough to move liquid inside the complicatedly-connected channels to a desired position, and in this case, a separate device must be equipped to obtain additional energy for moving liquids such as samples and specimens to the desired position due to restriction of size of the diagnostic cartridge.

Meanwhile, nonspecific absorption of protein among proteins or to a wall surface of a structure is a frequent phenomenon that occurs in a biosensor field. Generally, possibility of generating a nonspecific absorption on a wall surface of structure is relatively high due to high area ratio relative to area versus volume, as scale becomes smaller like micro size or nano size.

In order to reduce the nonspecific absorption phenomenon, a wall surface of channel is directly blocked using polymer, or a large amount of coating agents (or a large quantity of proteins present in samples) is made to flow inside the channels along with the samples to indirectly reduce the nonspecific absorption phenomenon.

A washing function in a micro-fluidic device (chip or cartridge) measuring sandwich immunoassay by way of an electrochemical method is very important for a high-sensitive quantitative analysis. Particularly, the nonspecific absorption that occurs on an electrode of enzyme conjugated antibody or a wall surface of channels about an electrode functions to increase a background signal and to act as a factor that interrupts the high-sensitive quantitative analysis.

A conventional immune response protocol has used a method of reducing the nonspecific absorption by using a separate washing solution. However, the conventional method has a disadvantage in that a large quantity of washing buffer is needed, and particularly long-term storage and transfer must be additionally realized in addition to substrate solution in case of immune diagnosis equipment for point-of-care diagnosis.

SUMMARY

The present invention has been made to solve disadvantages of the prior art and therefore an object of certain embodiments of the present invention is to provide a diagnostic cartridge equipped with a membrane having a valve function capable of moving all samples and specimens to channels and preventing inflow of liquid, and a control method for the diagnostic cartridge.

Another object of certain embodiments of the present invention is to provide a diagnostic cartridge capable of applying a physical force for controlling movement of liquid inside a channel, and a control method for the diagnostic cartridge.

Still another object of certain embodiments of the present invention is to provide a diagnostic cartridge capable of removing or preventing nonspecific absorption of protein, and a control method for the diagnostic cartridge.

Still further object of certain embodiments of the present invention is to provide a diagnostic cartridge capable of effectively performing a sequential transfer of liquid in a channel contained in the diagnostic cartridge, and a control method for the diagnostic cartridge.

Technical subjects to be solved by the present invention are not restricted to the above-mentioned description, and any other technical problems not mentioned so far will be clearly appreciated from the following description by the skilled in the art. That is, the present invention will be understood more easily and other objects, characteristics, details and advantages thereof will become more apparent in the course of the following explanatory description, which is given, without intending to imply any limitation of the disclosure, with reference to the attached drawings.

An object of the invention is to solve at least one or more of the above problems and/or disadvantages in whole or in part and to provide at least advantages described hereinafter. In order to achieve at least the above objects, in whole or in part, and in accordance with the purposes of the invention, as embodied and broadly described, and in one general aspect of the present invention, there is provided a diagnostic cartridge, the diagnostic cartridge comprising: a sample port through which a sample is injected; a first chamber moving the sample injected from the sample port; a second chamber moving a substrate solution; a first membrane formed at a distal end of the first chamber to function as a valve for preventing other substances from being injected into the first chamber after the sample is completely moved; and a second membrane formed at a distal end of the second chamber to function as a valve for preventing other substances from being injected into the first chamber after the substrate solution is completely moved.

Preferably, the diagnostic cartridge further comprises: a first channel perpendicularly connected to the first membrane to re-move the sample injected from the first membrane; a second channel perpendicularly connected to the second membrane to re-move the substrate solution injected from the first membrane; and a T junction, which is an area where a distal end of the first channel and a portion of the second channel are connected, to mix the sample and the substrate solution.

Preferably, the diagnostic cartridge further comprises a pressure pump connected to the other distal end of the first channel to push an air pressure into the first channel.

Preferably, the diagnostic cartridge further comprises a 3-way valve connecting the first channel to the pressure pump or blocking the first channel from the pressure pump.

Preferably, the diagnostic cartridge further comprises a pressure sensor interposed between the pressure pump and the first channel for sensing a pressure inside the diagnostic cartridge.

Preferably, the diagnostic cartridge further comprises an actuator applying a physical force to move the substrate solution of the second chamber to the T junction.

Preferably, the second chamber includes a tape for interrupting an outside air pressure to maintain an inner pressure, and the actuator applies a physical force to push the tape to an inner direction of the second chamber.

Preferably, the tape is destructed if the physical force applied by the actuator surpasses a pre-set numerical value.

Preferably, the diagnostic cartridge further comprises a third chamber connected to a distal end of the second channel to collect reaction-finished solution.

Preferably, the third chamber further includes an absorbent pad for allowing the reaction-finished solution to be captured in the absorption pad.

Preferably, the diagnostic cartridge further comprises a vacuum pump connected to the third chamber to suck air and to move fluid contained in the first channel or the second channel.

Preferably, the diagnostic cartridge further comprises a 3-way valve connecting the third chamber to the vacuum pump or blocking the third chamber from the vacuum pump; and a pressure sensor interposed between the vacuum pump and the third chamber to sense a pressure inside the diagnostic cartridge.

Preferably, the diagnostic cartridge further comprises at least one electrode connected to the first channel or to the second channel to recognize a position of the fluid or to electrochemically measure the reaction, wherein the electrode is secured with a first antibody, and the sample of fluid is in a state of antigen and a second antibody being reacted and coupled.

Preferably, each of the first and second membranes is positioned on a planar surface different from that of the first and second channels.

In another general aspect of the present invention, there is provided a control method for a diagnostic cartridge, the diagnostic cartridge comprising: a first channel moving a sample supplied from a first chamber containing the sample; a second channel moving a substrate solution supplied from a second chamber containing the substrate solution; a T junction where a distal end of the first channel and a portion of the second channel are connected; a pressure pump connected to the other distal end of the first channel to push an air pressure into the first channel; an actuator connected to the second chamber to apply a physical force for movement of the substrate solution or for adjustment of atmospheric pressure; and a vacuum pump connected to the other distal end of the second channel to move a material contained in the first or second channels, and the control method for the diagnostic cartridge comprises: sucking, by the vacuum pump, air to move the sample contained in the first channel; applying, by the actuator, a physical force to move the substrate solution to the T junction after the sample is moved to the second channel; and sensing a reaction result occurring in the second channel.

Preferably, the control method further comprises: punching, by the actuator, a tape attached to a distal end of the second chamber to prevent inflow of outside air; opening a distal end of the first channel connected to the pressure pump; and forming an air segment inside the channel after the step of opening the one distal end of the first channel by allowing the vacuum pump to suck the air inside the channel.

Preferably, the step of forming the air segment includes adjusting an operation of the vacuum pump to periodically and continuously form the air segment.

Preferably, the step of forming the air segment includes controlling a size of the air segment by adjusting a pressure ratio between a pressure of the vacuum pump and a pressure of the pressure pump.

Preferably, the control method further comprises: cleaning protein sucked to the second channel by moving the formed air segment; and re-connecting a distal end of the first channel connected to the pressure pump to a distal end of the second chamber connected to the actuator to re-move the sample and the substrate solution.

Preferably, the size of the air segment is proportionate to a channel width (Wc) and inverse proportion to a capillary number (Ca).

The diagnostic cartridge and control method for diagnostic cartridge according to the present invention have an advantageous effect in that any further inflow of liquid can be prevented after samples or specimens are completely moved to channels.

The diagnostic cartridge and control method for diagnostic cartridge according to the present invention have another advantageous effect in that, in order to control movement of liquid inside a channel, a physical force is applied to easily move the liquid inside the channel to a desired position, whereby reaction can be effectively generated.

The diagnostic cartridge and control method for diagnostic cartridge according to the present invention have still another advantageous effect in that nonspecific absorption of protein can be removed or prevented, and a sequential transfer of liquid can be effectively performed inside a channel contained in the diagnostic cartridge.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

Figure 1A:
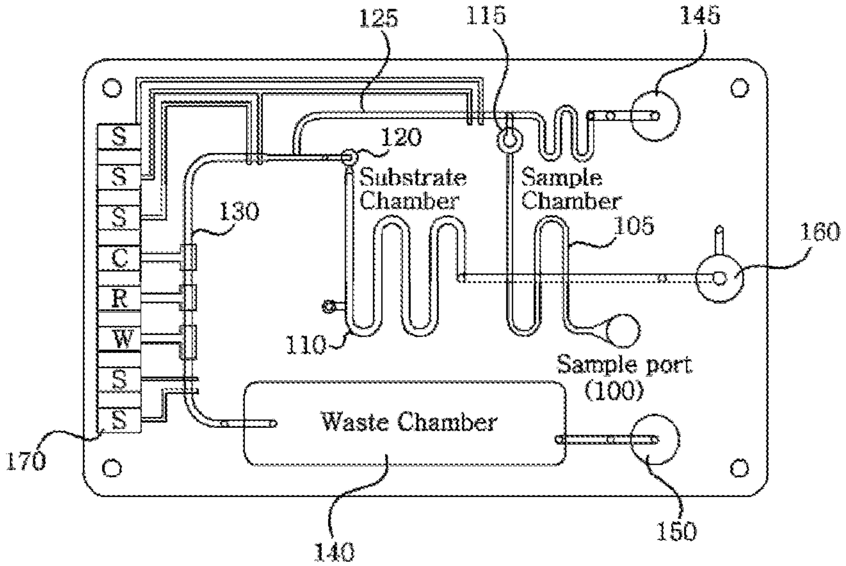
FIGS. 1*a* and 1*b* illustrate configuration of a diagnostic cartridge according to an exemplary embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Thus, for example, reference to "a component" can include a combination of two or more components; reference to "fluid" can include mixtures of fluids, and the like.

As used herein, valves of the invention can also be used in larger scale channels, such as capillary channels, which are channels wherein a fluid can flow by capillary action.

As used herein, diagnosis refers to a predictive process in which the presence, absence, severity or course of treatment of a disease, disorder or other medical condition is assessed. As used herein, a patient or subject includes any mammals for which diagnosis is contemplated. Humans are the preferred subjects.

As used herein, solution, liquid and fluid may be interchangeably used.

As used herein, the terms "channel" or "chamber" as used herein are not intended to be restricted to elongated configurations where the transverse or longitudinal dimension greatly exceeds the diameter or cross-sectional dimension. Rather, such terms are meant to comprise cavities or tunnels of any desired shape or configuration through which liquids may be directed. Such a fluid cavity may, for example, comprise a flow-through cell where fluid is to be continually passed or, alternatively, a chamber for holding a specified, discrete amount of fluid for a specified amount of time. "Channels" and "chambers" may be filled or may contain internal structures or materials comprising, for example, liquid, fluid, solution, valves, filters, and similar or equivalent components and materials.

Now, the diagnostic cartridge and control method for diagnostic cartridge according to exemplary embodiments of the present invention will be explained and described with reference to the accompanying drawings.

Figure 1B:
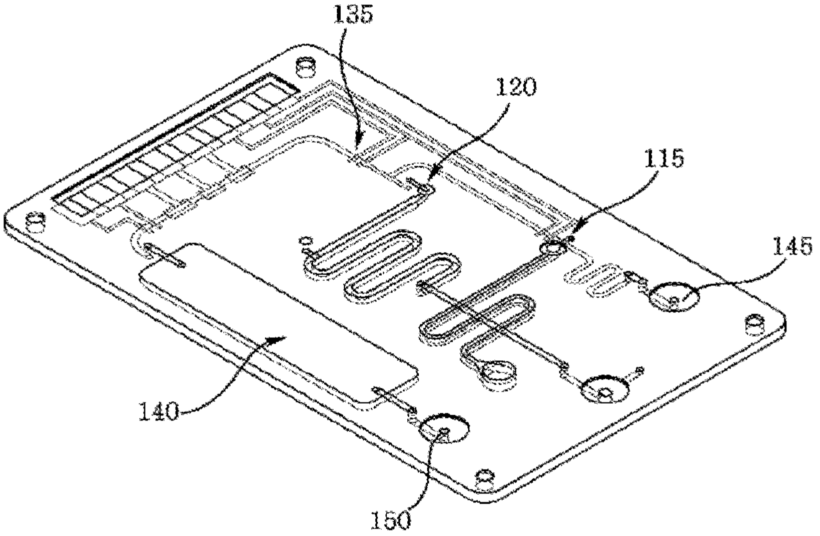

FIGS. 1*a* and 1*b* illustrate configuration of a diagnostic cartridge according to an exemplary embodiment of the present invention, where FIG. 1*a* illustrates a plan view of the diagnostic cartridge viewed from the top, and FIG. 1*b* illustrates a pictorial drawing of the diagnostic cartridge.

Referring to FIGS. 1*a* and 1*b*, the diagnostic cartridge according to an exemplary embodiment of the present invention include a sample port (100), a first chamber (105), a second chamber (110), a first membrane (115), a second membrane (120), a first channel (125), a second channel (130), a T junction (135), a third chamber (140), atmospheric pressure ports (145, 150) and an actuator (160).

The sample port (100) may have a function of receiving a sample which is a subject of measurement, where fluid of the sample may include at least any one of blood, urine, serum and saliva.

The first chamber (105) functions to transfer the sample received from the sample port (100) to the first membrane (115). To be more specific, the sample injected from the sample port (100) moves to the first membrane (115) along a channel by capillarity. A wall surface of the channel in the first chamber (105) is secured with an enzyme conjugated antibody in a dry state. Thus, a target antigen contained in the sample injected from the sample port (100) reacts with the enzyme conjugated antibody secured on the wall surface (Reconstitution and first immunoreaction). For compatibility in a manufacturing process, a channel portion of the first chamber may be combined during cartridge assembly subsequent to a separate manufacturing and an immobilization operation such as freeze-dry.

The third chamber (140) includes an absorbent pad, thickness of which may be lower than height of the third chamber (140). The absorbent pad serves to restrict the liquid to be transferred by a vacuum pump (190, to be described later) to the third chamber (140) and to prevent the liquid from inflow into the vacuum pump (190). That is, the third chamber (140) functions to store the liquid sucked b the vacuum pump (190).

The second chamber (110) includes a substrate solution, and moves the substrate solution to the second membrane (120) using a physical force or an air pressure.

The first membrane (115) is positioned at an outlet (i.e., a distal end) of the first chamber (105), and functions as a valve to prevent the sample from flowing into the first chamber (105) after all the samples are moved.

Although the function of valve is to be described later, a simple description is provided here for reference. That is, the valve can send samples to the first channel (125), but prevent other materials (e.g., air) from entering the first chamber (105) from the first channel (125).

The second membrane (120) is positioned at an outlet (i.e., a distal end) of the second chamber (110), and functions as a valve to prevent the substrate solutions from flowing into the second chamber (110) after all the substrate solutions are moved.

Although the function of valve is to be described later, a simple description is provided here for reference. That is, the valve can send the substrate solutions to the second channel (130), but prevent other liquid from entering the second chamber (110) from the second channel (130).

Furthermore, the first chamber (115) may be used for separating blood corpuscles from blood samples, and function as a support to secure dried reagent. The second membrane (120) may also function as a support to secure dried reagent. An electrode (170) functions to control operation of the diagnostic cartridge or sense reaction. To be more specific, the electrode includes a sensing electrode for recognizing position of liquid, a counter electrode for performing electrochemical measurement, and a working electrode. The working electrode is secured with target antigen and antibody for specific reaction. A plurality of working electrodes may be formed to perform multiplexed immunoassay, and may be used for an object of correcting background signal using a secondary working electrode such as immune-reference electrode.

The electrode (170) is secured with a first antibody, and fluids in sample include antigen and a second antibody that are combined by being reacted. Detection of reaction of fluids in sample is performed by electrochemical method or an optical method.

The atmospheric pressure ports (145, 150) are respectively connected to a pressure pump (180) and a vacuum pump (190). The pressure pump (180, not shown) is connected to an extension of the first channel (125) to adjust air pressure. Detailed operation of the pressure pump (not shown) will be described later.

The vacuum pump (not shown) is connected to the third chamber (140) and functions to suck materials (liquid or air) in the channel. Detailed operation of the vacuum pump (not shown) will be also described later.

The actuator (160) functions to move materials in the second chamber (110) by applying physical force to the materials, or vent the materials by punching a tape that separates liquid in the second chamber (110) from outside. Detailed operation of the actuator (160) will be also described later with reference to FIG. 2*a*.

The T junction (135) refers to a T-shaped channel where a distal end of the first channel (125) and the second channel (130) meet. The material moved from the first channel (125) and the material moved from the second channel (130) meet at the T junction (135), and in a case only air is moved from the first channel (125), an air segment is formed at the T junction (135) by the material moved from the second channel (130).

Figure 2A:
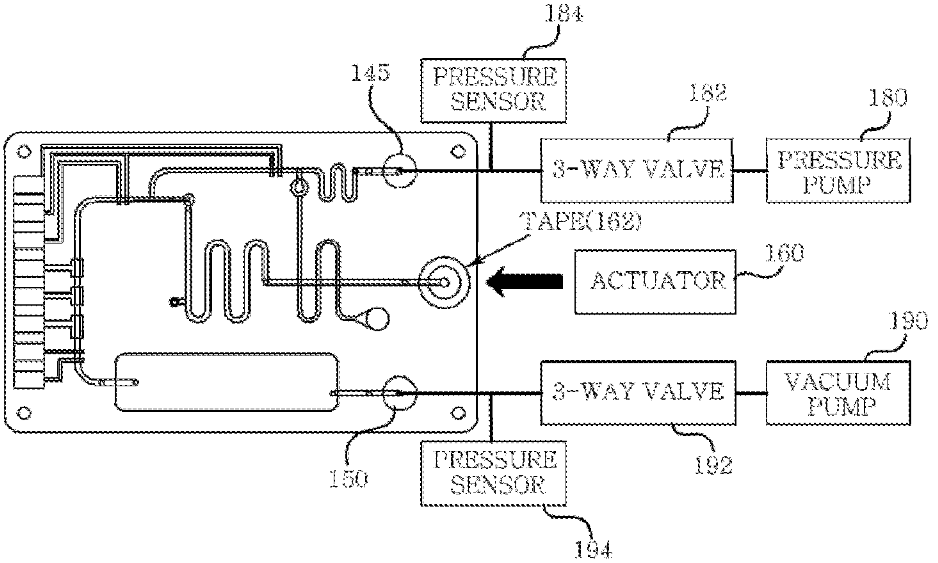
FIGS. 2*a* and 2*b* illustrate a configuration of a system for driving a diagnostic cartridge according to an exemplary embodiment of the present invention.
Figure 2B:
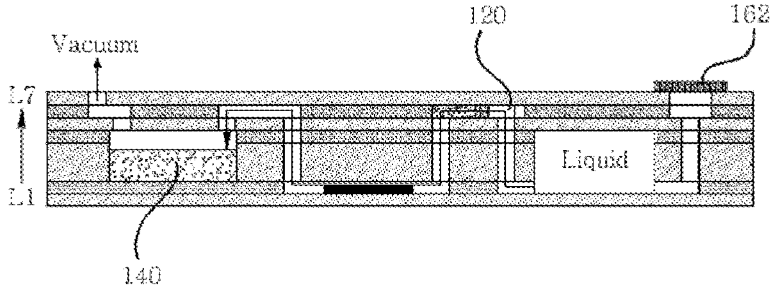

FIGS. 2*a* and 2*b* illustrate a configuration of a system for driving a diagnostic cartridge according to an exemplary embodiment of the present invention.

Referring to FIG. 2*a*, liquid (sample) moved to the first channel (125) via the first membrane (115) moves toward the T junction (135) by the vacuum pump (190). At this time, other liquid (substrate solution) inside the second chamber (110) is interrupted from outside by a tape (162), such that discharge of the other liquid is controlled by pressure. That is, configuration of the actuator (160) and the tape (162) functions as a one-shot valve that allows movement of solution at an opportune time after controlling the movement of the solution for a time.

The pressure pump (180) is connected to an extension of the first channel (125), and a pressure sensor (184) and a 3-way valve (182) are formed on the extension. The vacuum pump (190) is connected to the extension, and a pressure sensor (194) and a 3-way valve (192) are formed on the extension.

An inner pressure of the diagnostic cartridge measured by the pressure sensors (184, 194) acts as a feedback signal, in a case the pressure pump (180) or the vacuum pump (190) is driven. That is, the movement of liquid is adjusted by controlling the operation of the pressure pump (180) or the vacuum pump (190) in response to the inner pressure of the diagnostic cartridge. The 3-way valves (182, 192) function to transmit pressure from the pumps (in-line mode) or to dissipate the pressure accumulated in the cartridge (vent mode). Detailed operation of the 3-way valves (182, 192) will be described later with reference to FIGS. 4*a*, 4*b* and 4*c*.

The vacuum pump (190) largely serves to transfer the liquid and the pressure pump (180) is largely used for controlling pressure of channels present inside the cartridge. The actuator (160) functions to punch the tape (162) to discharge the substrate solution to the T junction (135).

FIG. 2*b* is a cross-sectional view of a diagnostic cartridge according to an exemplary embodiment of the present invention to assist in understanding of explanation with regard to FIG. 2*a*.

Referring to FIG. 2*b*, the diagnostic cartridge is configured to include a plurality of levels. Although FIG. 2*b* illustrates a height having seven levels, it should be apparent that the number of levels may be smaller or larger than what is shown in FIG. 2*b*. Particularly, although FIG. 2*b* illustrates a cross-sectional view of a path in which substrate solution contained in the second chamber (110) moves, it should be apparent that the moving path of samples contained in the first chamber (105) can also have a height formed with a plurality of levels as in FIG. 2*b*.

Referring to FIG. 2 *b*, in a case air is sucked by the vacuum pump (190), the substrate solution passes the second membrane (120) to move to the third chamber (140). The third chamber (140) is formed with an absorbent pad that functions to absorb materials flown from the third chamber (140). Particularly, one surface of the substrate solution is blocked from outside by the tape (162) which can be punched by operation of the actuator (160) as explained in the foregoing.

Although the backflow of solution can be prevented by valve function of the second membrane (120) in the cartridge having a structure of the plurality of levels, the backflow of solution can be also prevented by height difference. Although the solution flown to the third chamber (140) can be absorbed by the absorbent pad, height difference with the second channel (130) can also prevent backflow of the solution.

FIGS. 3*a* to 3*g* illustrate operation of a membrane having a valve function in a diagnostic cartridge according to an exemplary embodiment of the present invention.

Figure 3A:
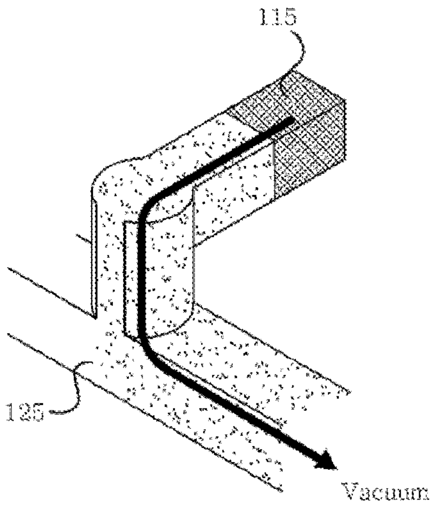
FIGS. 3*a* to 3*g* illustrate operation of a membrane having a valve function in a diagnostic cartridge according to an exemplary embodiment of the present invention.

Referring to FIG. 3*a*, a sample or solution passes the membranes (115, 120) to move to the channels (125, 130) by the force of the vacuum pump (190) or by the force of the pressure pump (180). The membranes (115, 120) may be formed with fabric film or high polymer film. Although solution injected from the chambers (105, 110) may continuously flow to the channels (125, 130) via the membranes (115, 120) without interruption, the solution may no longer flow to the channels (125, 130) if the solution from the chambers (105, 110) are all dissipated and captured by the membranes (115, 120) in view of the physical properties of membranes (115, 120).

Figure 3B:
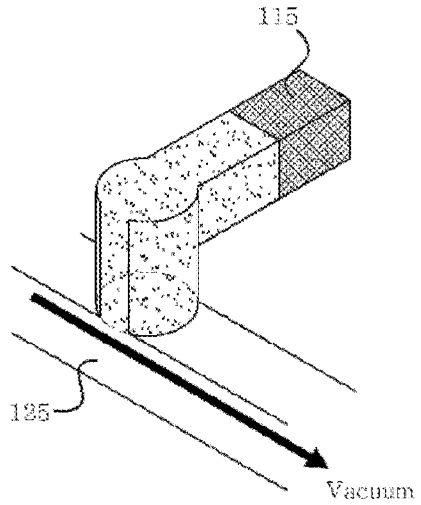

At this time, pressure is applied to the pressure pump (180) to allow the solution to be separated from the membranes (115, 120), where the liquid captured and secured by the membranes (115, 120) functions to prevent a material (air) inside the channels (125, 130) from being discharged to the outside. That is, as shown in FIG. 3*b*, other materials or air can only flow along the channels (125, 130) but cannot flow to a direction blocked by the liquid and the membranes (115, 120). That is, the other materials or air serve as valves as the other materials or air are prevented from flowing to the first chamber (105) via the membranes (115, 120).

To help understand the configuration and function of the membranes (115, 120), the membranes (115, 120) having the valve function will be explained again with reference to FIGS. 3*c* and 3*d*. Directions of channels (125, 130) in FIGS. 3*c* and 3*d* are twisted 90 degrees for convenience of explanation.

Figure 3C:
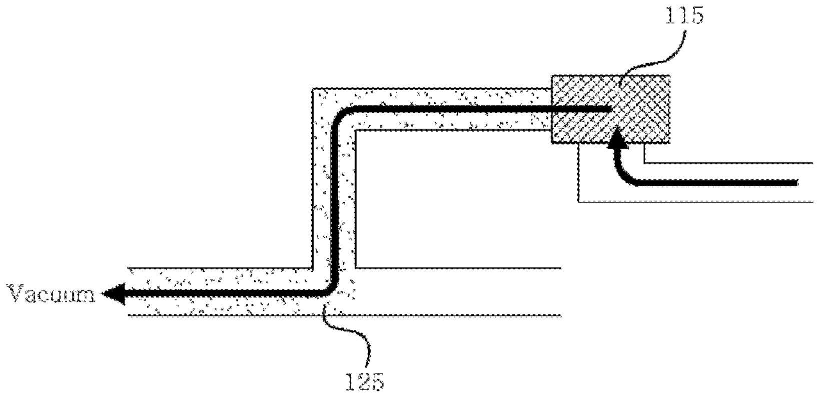
Figure 3D:
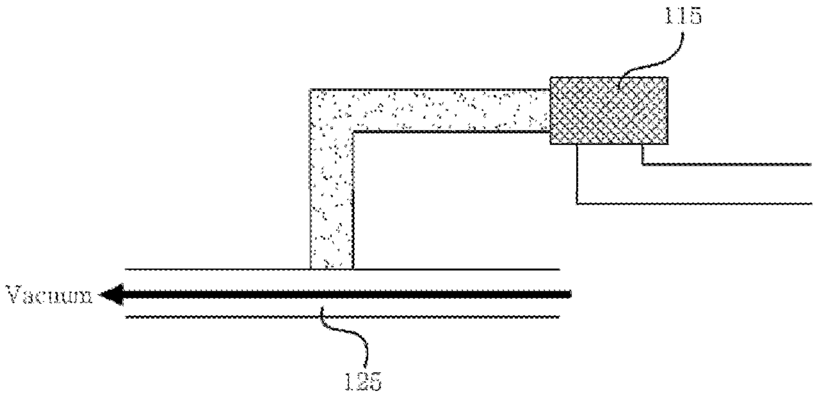

As illustrated in FIG. 3*c*, the solution (sample or substrate solution) having passed the membranes (115, 120) slips out to the channels (125, 130) by the force applied by the vacuum pump (190) or the pressure pump (180). If the solution is all dissipated while continuously slipping toward the channels (125, 130), the pressure pump (180) applies a force to separate the solution from the membranes (115, 120).

The solution is captured by the membranes (115, 120) due to physical properties, cohesiveness and surface tension of the membranes (115, 120), such that air can pass the channels (125, 120) while channels to the membranes (115, 120) are all blocked, which makes the membranes (115, 120) function like valves.

The membranes (115, 120) having the valve function are used to separate blood corpuscle from blood sample, and to function as supports for securing the dried reagent as well.

Figure 3E:
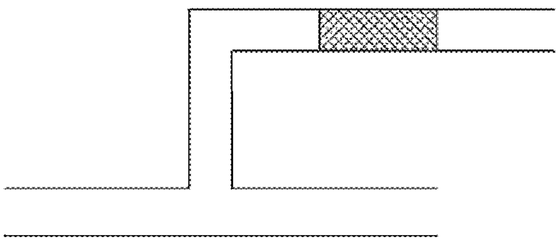
Figure 3F:
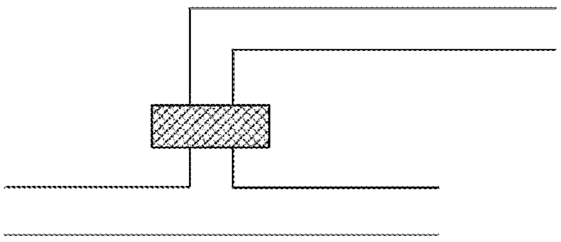
Figure 3G:
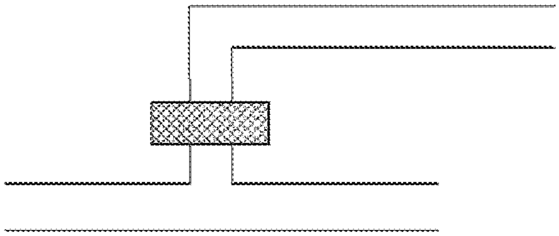

Meanwhile, the configuration of membranes having the valve function according to an exemplary embodiment of the present invention may be realized by configuration shown in FIGS. 3*e*, 3*f* and 3*g*. FIG. 3*e* illustrates a cross-sectional view of a membrane having a valve function according to an exemplary embodiment of the present invention, where the first membrane (115) may be formed with a same height of level as that of the first chamber (105) unlike FIG. 3*c*. However, the function thereof is identical to that of FIG. 3*c*.

FIG. 3*f* illustrates a cross-sectional view of a membrane having a valve function according to another exemplary embodiment of the present invention, where the first membrane (115) may be formed at a portion that is bent for being connected to the first channel (125).

Meanwhile, FIG. 3*g* illustrates a cross-sectional view of a membrane having a valve function according to still another exemplary embodiment of the present invention, where FIG. 3*g* is a cross-sectional view, not taken from the side, but taken from the top, unlike FIGS. 3*e* and 3*f*.

That is, although the first membrane (115) may be formed at a portion that is bent for being connected to the first channel (125) as in FIG. 3*f*, it can be assumed that height of the first membrane (115) and height of the first channel (125) are same.

The membrane having a valve function according to still another exemplary embodiment of the present invention is not restricted to the configuration of membrane illustrated in FIGS. 3*a* to 3*g*, and it should be apparent to the skilled in the art that the membrane can be configured in various methods as long as the membrane has the same function.

Figure 4A:
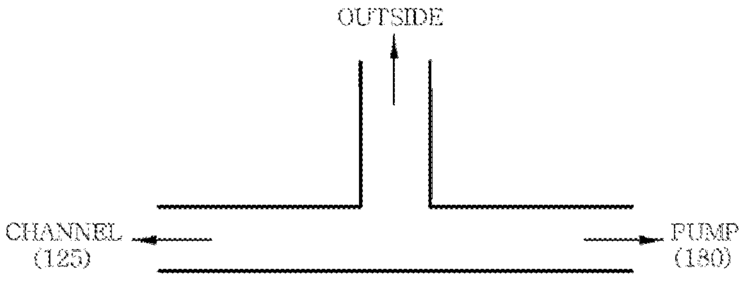
FIGS. 4*a*, 4*b* and 4*c* illustrate an operation of a 3-way valve in a diagnostic cartridge according to an exemplary embodiment of the present invention.
Figure 4B:
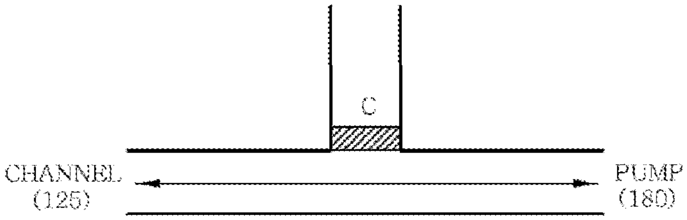
Figure 4C:
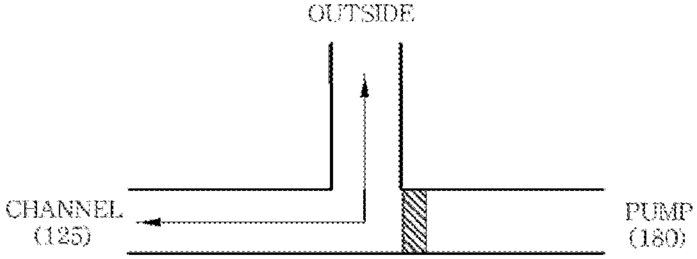

FIGS. 4*a*, 4*b* and 4*c* illustrate an operation of a 3-way valve in a diagnostic cartridge according to an exemplary embodiment of the present invention.

FIG. 4*a* illustrates a configuration of a 3-way valve (182) with no operation at all. As illustrated in FIG. 4*a*, the 3-way valve (182) has a trifurcation path leading to an outside, a pump (180) and a channel (125).

FIG. 4*b* illustrates a configuration of a 3-way valve (182) in which flow is possible between the channel (125) and the pump (180), but flow is blocked to the outside. That is, a path leading to the outside is blocked, while air or liquid is movable only between the channel (125) and the pump (180).

FIG. 4*c* illustrates a configuration of a 3-way valve (182) in which flow is possible between the channel (125) and the outside, but flow is blocked to the pump (180). That is, a path leading to the pump (180) is blocked, while outside air is movable only to the channel (125).

Operations of injecting or sucking air and moving liquid can be controlled through configurations of 3-way valve (182) illustrated in FIGS. 4*a* to 4*c*.

Meanwhile, the 3-way valve shown in FIGS. 4*a* to 4*c* is applicable, without any change, to the 3-way valve (192) existing between the third chamber (140) and the vacuum pump (190).

Figure 5:
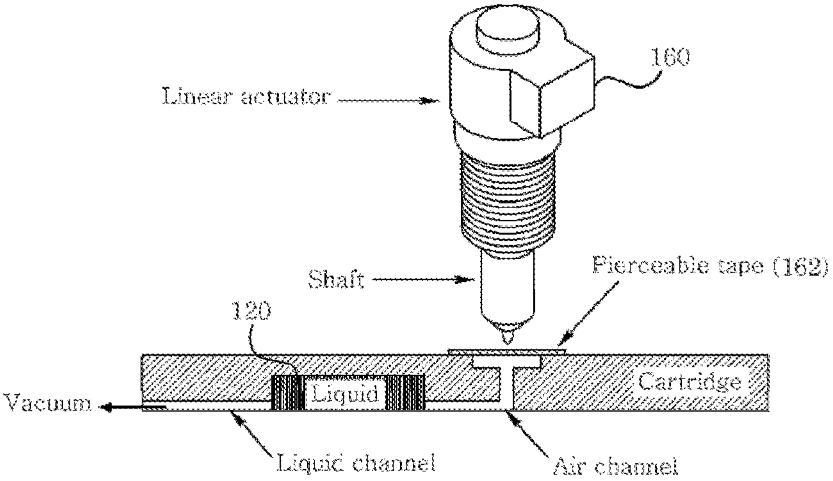
FIG. 5 is a schematic view illustrating a configuration of an actuator, a component of a diagnostic cartridge according to an exemplary embodiment of the present invention.

FIG. 5 is a schematic view illustrating a configuration of an actuator, a component of a diagnostic cartridge according to an exemplary embodiment of the present invention.

Referring to FIG. 5, a distal end of the second chamber (110) is covered with a tape (162) or a flexible membrane and blocked from outside to functionally prevent flow of air. The tape (162) is formed with a punchable material.

The actuator (160), vertically movable, is formed with a sharp distal end to burst or rupture the tape (162) that blocks the distal end of the second chamber (110). At this time, the tape (162) is pushed inside before being ruptured, such that a physical force can be transferred to the solution in the second chamber (110). The tape (162) may be manufactured with a shape having a variety of strengths. Time taken to rupture the tape (162) by the actuator (160) or rupture shape may be changed in response to the tape (162) having a pre-set strength.

FIGS. 6*a* to 6*d* sequentially illustrate an operation of an actuator, a component of a diagnostic cartridge according to an exemplary embodiment of the present invention.

Figure 6A:
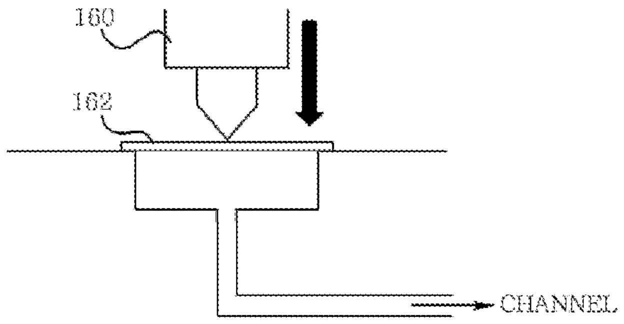
FIGS. 6*a* to 6*d* sequentially illustrate an operation of an actuator, a component of a diagnostic cartridge according to an exemplary embodiment of the present invention.
Figure 6B:
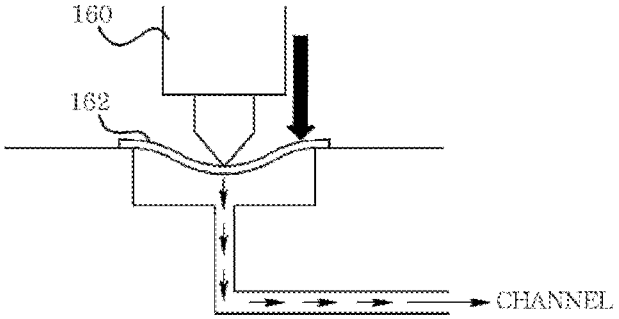

Referring to FIG. 6*a*, a distal end of an air channel leading the second chamber (110) is blocked by the tape (162). Thus, the air inside the channel is in the state of being blocked from the outside. The actuator (160), which horizontally moves, applies a force to the tape (162), where the tape (162) is bent downward by the force applied by the actuator (160). The air inside the channel is moved by the physical force push out the solution inside the second chamber (110). To be more specific, the solution inside the second chamber (110) is pushed up to the T junction(135) to promote the reaction.

Figure 6C:
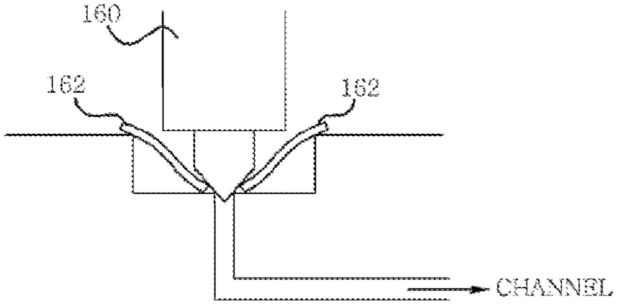
Figure 6D:
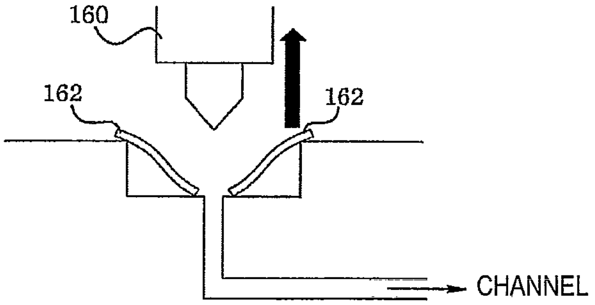

Thereafter, in a case the actuator (160) moves further downward to rupture the tape (162) as shown in FIGS. 6*c* and 6*d*, the channel can be connected to the outside to move the air.

As illustrated in FIG. 6*a*, in a case the distal end of the channel is blocked by the tape, the substrate solution inside the second chamber (110) is not moved due to pressure inside the channel, even if the air is sucked by the vacuum pump (190). However, once the substrate solution inside the second chamber (110) is moved by the physical force of the actuator (160) to rupture the tape (162), the substrate solution can be moved by the force of the vacuum pump (190) because the distal end is opened to the outside. That is, if the physical force of the actuator (160) exceeds an intrinsic strength of the tape (162), the tape (162) is burst to allow the substrate solution to move. Thus, each of the actuator (160) and the tape (162) has a one-shot valve function, that is, a function of allowing the solution to move after the tape is ruptured, although the tape has an initial function of blocking the solution.

To be more specific, the one-shot valve holds the substrate solution until the sample moved from the first chamber (105) reaches the T junction through the first channel (125), and the substrate solution is moved to the T junction by the physical force applied by the actuator (160) after the sample reaches the T junction. The substrate solution moves toward the electrode (170) by the physical force of the vacuum pump (190) after the tape (162) is ruptured by the actuator (160). The substrate solution thus discharged is used for washing by generation of enzymatic reaction or air segment.

In the foregoing explanation, the actuator (160) may be formed with a cone-shaped pin to rupture the tape (162). However, any shape of the pin may be used as long as the actuator can burst the tape. Furthermore, a channel containing air may be formed between the tape (162) and the second chamber (110) to be used for realization of the above-mentioned function.

Figure 7:
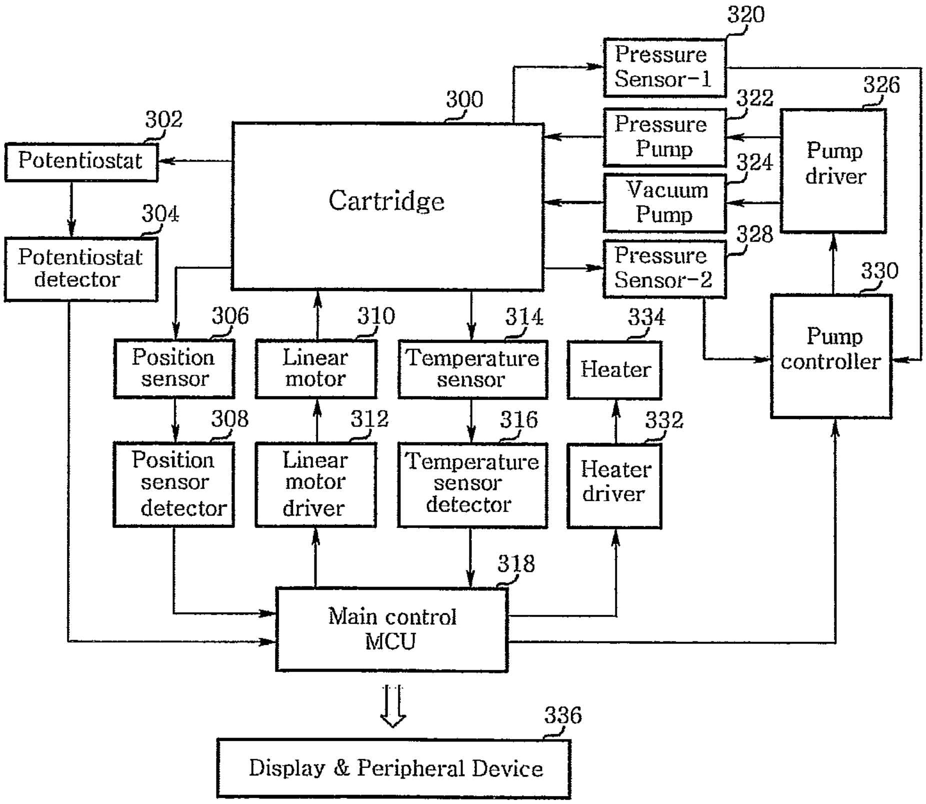
FIG. 7 is a block diagram illustrating a configuration of a system for controlling a diagnostic cartridge according to an exemplary embodiment of the present invention.

FIG. 7 is a block diagram illustrating a configuration of a system for controlling a diagnostic cartridge according to an exemplary embodiment of the present invention.

Configurations useable for operating the diagnostic cartridge that are added to the diagnostic cartridge and functions of the configurations will be described with reference to FIG. 7.

The diagnostic cartridge (300) according to an exemplary embodiment of the present invention may utilize an electrochemical detection method. An electrochemical measurement unit (302) is configured to measure an electrochemical reaction, and an electrochemical detecting unit (304) has a function of signal-processing a measurement result by the electrochemical measurement unit (302).

The diagnostic cartridge (300) according to an exemplary embodiment of the present invention also includes a position sensor (306) for detecting a position of solution and a position sensor detecting unit (308) performing a signal-processing relative to the position. The diagnostic cartridge (300) according to an exemplary embodiment of the present invention also includes a linear motor (310) configured to performing transfer of substrate solution, a pump driving unit (326) related to pumping operation for solution transfer and a pump controller (330) for controlling the pump driving unit (326), where the pump driving unit drives a pressure pump (322) and a vacuum pump (324). Pressure sensors (320, 328) are also mounted for monitoring pressure change during drive.

Lastly, temperature is greatly influenced during enzymatic reaction, such that the diagnostic cartridge (300) includes a heater (334) for maintaining an adequate temperature (e.g., 37° C.) and a heater driving unit (332) for driving the heater (334), a temperature sensor (314) for sensing the temperature related to operation thereof and a temperature sensing detecting unit (316) for signal-processing the sensed temperature. The diagnostic cartridge (300) may also include a main controller (318) for controlling these functions and a display unit (336) for displaying the measurement result.

The configuration illustrated in FIG. 7 is just a configuration for optimizing functions of the diagnostic cartridge (300) according to an exemplary embodiment of the present invention, and if the configuration is intended only for promoting functions of the diagnostic cartridge (300) according to an exemplary embodiment of the present invention, some of the components illustrated in FIG. 7 may be omitted, or components not shown in FIG. 7 may be added.

Each of FIGS. 8*a* to 8*d* sequentially illustrates a process of a diagnostic cartridge according to an exemplary embodiment of the present invention.

Figure 8A:
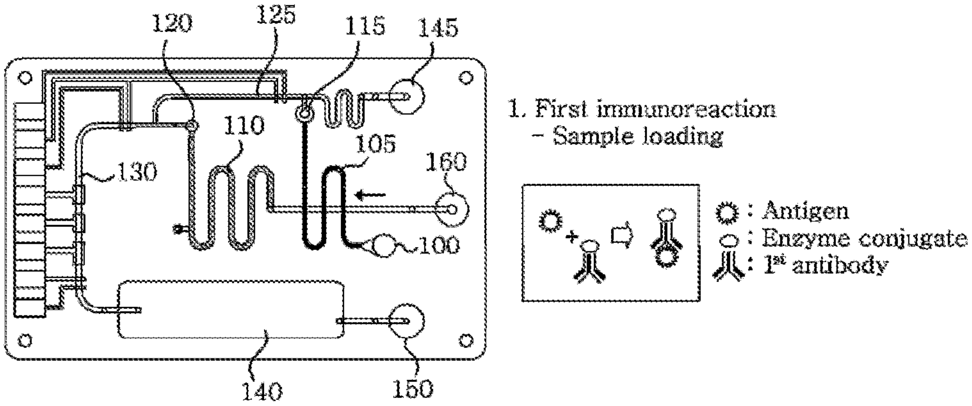
FIGS. 8*a* to 8*d* sequentially illustrate a process of a diagnostic cartridge according to an exemplary embodiment of the present invention.

Referring to FIG. 8*a*, in a case the sample solution is injected into the sample port (160), the sample solution is transferred to the first membrane (115) along the channel of the first chamber (105) by the capillary force, whereby a first immune-reaction occurs. That is, the enzyme conjugated antibody secured at the channel wall surface of the first chamber (105) reacts with the target antigen existing in the sample.

Figure 8B:
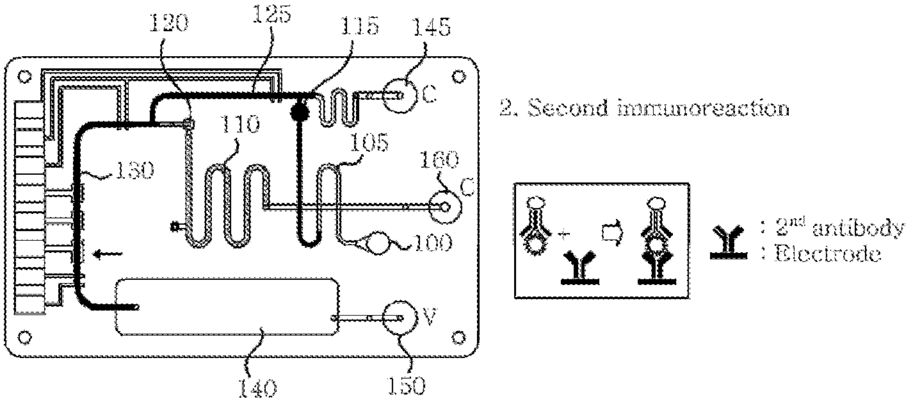

Referring to FIG. 8*b*, the sample in the first membrane (115) is transferred to the third chamber (140) via an electrode by driving of the vacuum pump (190) connected to the atmospheric pressure port (150). At this time, an antigen-enzyme conjugated antibody complex reacts with a second antibody (or capture antigen) secured at the electrode to generate a second immunoreaction. The vacuum pressure is controlled by adjustment of operation at the vacuum pump (19) during sample transfer, whereby flow velocity of sample solution can be maintained at a predetermined level.

In a case the sample is almost discharged from the first chamber (105), the pressure applied from the pressure pump (180) connected to the atmospheric pressure port (145) separates the sample from the first membrane (115). Thereafter, the sample remaining at the first membrane (115) serves to prevent the air pressure in the channel from being discharged during generation of air segment.

Figure 8C:
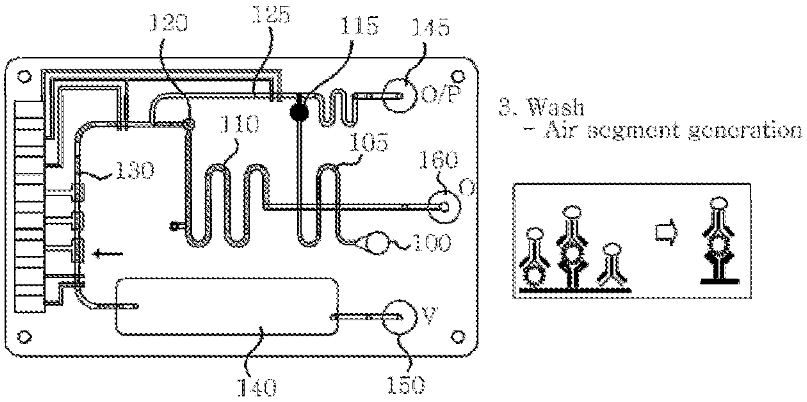

Referring to FIG. 8*c*, the 3-way valve (182) comes into a vent mode to be connected to the outside as shown in FIG. 4*c* when a rear end of the separated sample passes the T junction, where the actuator (160) applies a physical force to push the substrate solution to the T junction (135). Furthermore, the air pressure inside the channel is increased by driving of the pressure pump (180) and air segment starts to be generated from the T junction.

Size of the air segment is controlled by a pressure ratio between a pressure of the vacuum pump (190) and a pressure of the pressure pump (180). In a case liquid bubbles separated by the air segment in the channel moves, an internal recirculation occurs in the liquid bubbles. Nonspecific absorption on the channel or electrode can be reduced or removed by the internal re-circulation and liquid bubbles. Thus, the removal of nonspecific absorption by the generation of air segment can be expressed as a washing process.

Figure 8D:
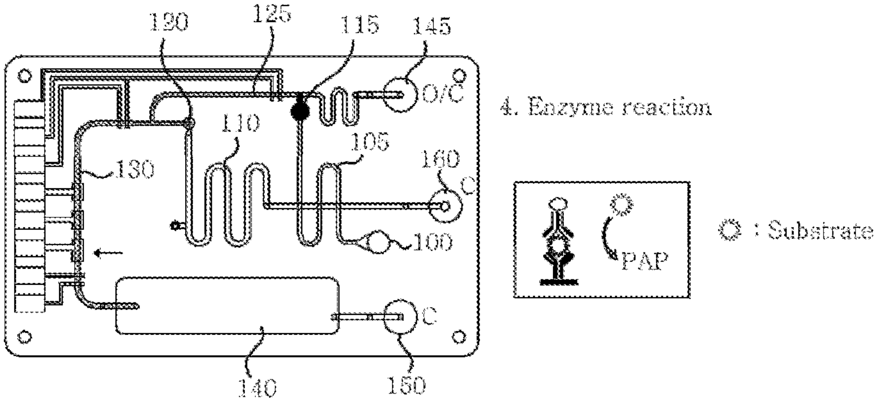

Referring to FIG. 8*d*, once the washing process is completed, the substrate solution generates electro-active species such as PAP or P-aminophenol according to enzyme on the electrode. In order to stop generation of air segment, the driving of pressure pump (180) is stopped, and the connected 3-way valve (182) is converted to a vent mode. In a case all the air segments in the electrode channel vanish, the operation of vacuum pump (190) is stopped to cause the connected 3-way valve (192) to be converted to a vent mode.

Thereafter, all the 3-way valves are converted to online mode. All the pressure inside the channel is dissipated through these processes, and the substrate solution about the electrode becomes immovable. The electrode is maintained at a predetermined temperature (e.g., 37° C.) to generate the electro-active species, where data measured by the electrode (170) is qualitatively analyzed.

Figure 9A:
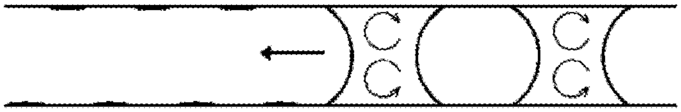
FIGS. 9*a*, 9*b* and 9*c* illustrate a control method for a diagnostic cartridge according to an exemplary embodiment of the present invention.
Figure 9B:
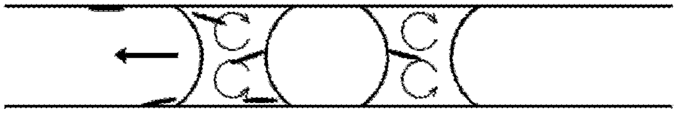
Figure 9C:
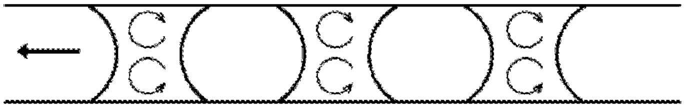

FIGS. 9*a*, 9*b* and 9*c* illustrate a control method for a diagnostic cartridge according to an exemplary embodiment of the present invention.

Referring to FIG. 9*a*, in a case the air segment formed by the T junction (135) moves among the channels, adsorbates present on channel walls (or electrodes) are removed as shown in FIG. 9*b*. To be more specific, the air segment produces rotation or circulation current, such that the adsorbates in the channels can be completely removed by the advancing direction of the air segment and internal circulation as shown in FIG. 9*c*. Meanwhile, the reaction of the air segment functions to remove the adsorbates and restrict generation of adsorbates as well.

Figure 10A:
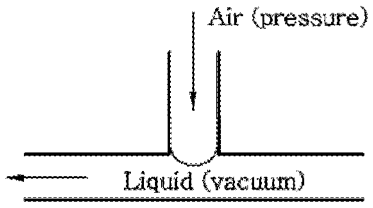
FIGS. 10*a* to 10*d* illustrate a method for forming an air segment in a control method for a diagnostic cartridge according to an exemplary embodiment of the present invention.
Figure 10B:
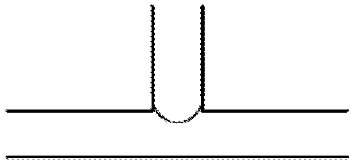

FIGS. 10*a* and 10*b* illustrate a method for forming an air segment in a control method for a diagnostic cartridge according to an exemplary embodiment of the present invention.

Figure 10C:
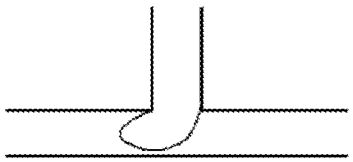
Figure 10D:
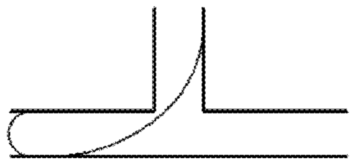

Referring to FIG. 10*a*, liquid (e.g., substrate solution) flows to the unbent second channel at the T junction (135), and air is inputted from the first channel (125). To be more specific, the air is received from the pressure pump (180) connected to the first channel (125). The air thus received slowly permeates the liquid as illustrated in FIG. 10*c*, and a predetermined amount of air is included in the liquid of the channel to form the air segment as shown in FIG. 10*d.*

At this time, the size of air segment may be controlled by a pressure ratio between a pressure of the vacuum pump (190) and a pressure of the pressure pump (180). That is, the size of air segment may be determined by suction power of the vacuum pump (190) and by power or period of air being pushed by the pressure pump (180).

Furthermore, the size of the air segment is proportionate to a channel width (We) and inverse proportion to a capillary number (Ca), where the capillary number (Ca) is defined by uV/r, where u is viscosity of fluid, V is a flow velocity, and r is surface tension of fluid. Therefore, size of bubble becomes smaller, as the wall surface of the channel becomes more hydrophilic, viscosity of fluid becomes higher, and size of bubble becomes smaller. The hydrophilic degree may become variable if the fluids are identical and flow velocity is constant.

According to the diagnostic cartridge thus configured, reentry of liquid can be prevented after all the samples and specimens are transferred to the channels. Furthermore, according to the diagnostic cartridge thus configured, the liquid can be easily moved to a desired position inside the channel by applying a physical force in order to control movement of liquid inside the channel, whereby reaction can be effectively generated. Furthermore, a diagnostic cartridge capable of performing a washing operation by sir segment can be provided.

Figure 11:
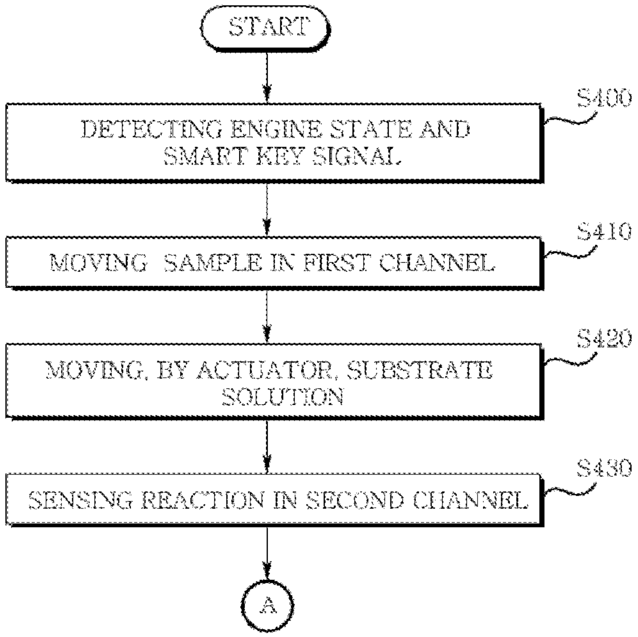
FIGS. 11 and 12 are flowcharts illustrating a control method for a diagnostic cartridge according to an exemplary embodiment of the present invention.
Figure 12:
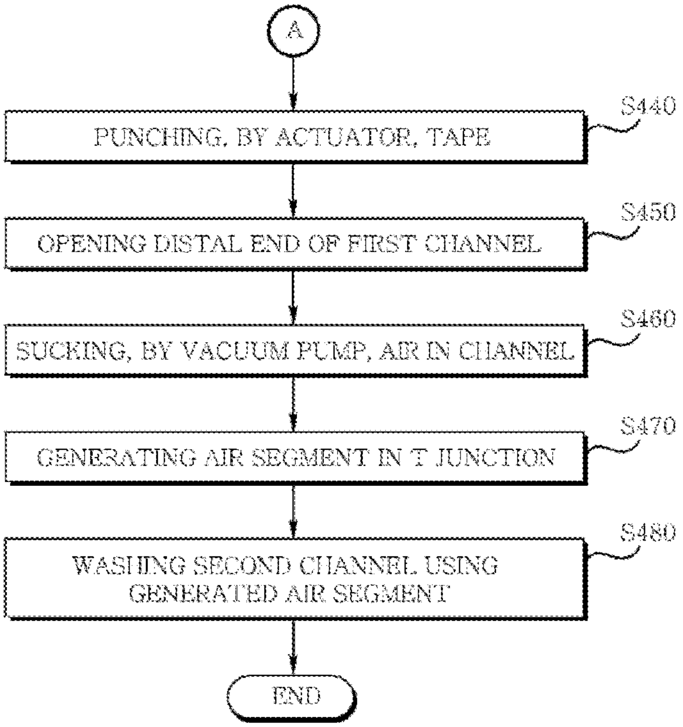

FIGS. 11 and 12 are flowcharts illustrating a control method for a diagnostic cartridge according to an exemplary embodiment of the present invention. FIG. 11 illustrates a step-by-step process of sensing a result of reaction in the sample and substrate solution in the diagnostic cartridge according to an exemplary embodiment of the present invention.

First, the vacuum pump (190) adsorbs air inside the cartridge (S400). To be more specific, the vacuum pump (190) adsorbs air contained in the channels (125, 130) inside the cartridge to move the sample or substrate solution inside the channels (125, 130), whereby the sample in the first channel (125) is moved (S410).

Furthermore, in a case the sample is moved up to the T junction (135) through the first channel (125), the substrate solution moved through the second channel (130) is physically moved by the actuator (160) (S420) and is punched to promote a free flow of the substrate solution. The physical movement by the actuator (160) has been already mentioned above, such that further explanation thereto will be omitted.

The substrate solution moved by the actuator (160) mixes with the sample and passes the second channel (130), where the electrode (170) formed on the second channel (130) senses the reaction thereof (S430).

The hitherto steps are a control method in the diagnostic cartridge according to an exemplary embodiment of the present invention, and the washing steps by generation of air segment will be described in detail with reference to the flowchart of FIG. 12.

FIG. 12 illustrates a step-by-step explanation of washing operation removing protein adsorbed by the second channel (135) with reference to explanation in FIGS. 9*a*, 9*b*, 9*c*, and FIGS. 10*a* to 10*d.*

A tape attached to a distal end of the second chamber (110) is punched (S440) to allow outside air to be blocked by the actuator (160), and a distal end of the first channel (125) is also opened (S450). The opening of the first channel (125) may be performed by the 3-way valve explained with reference to FIGS. 4*a* to 4*c*. However, it should be apparent that the punching step by the actuator (160) may be configured right subsequent to the step (S420) of moving the substrate solution in the steps included in FIG. 11.

Successively, the vacuum pump (190) sucks up air inside the channels (125, 130) (S460) to move air or solution inside the channels (125, 130). At this point, the pressure pump (180) may be also activated to help move the air or solution. Thus, the air segment is generated at the T junction (135) through the movement of air or solution. Explanation of generation of air segment will be omitted as it has been already provided in detail with reference to FIGS. 10*a* to 10*d.*

The generated air segment moves through the second channel (130) to wash the protein adsorbed to the second channel (130) as explained with reference to FIGS. 9*a* to 9*c* (S480). That is, in a case the air segment formed by the T junction (135) moves between the channels, the adsorbents existing on channel walls (or electrode) are removed. To be more specific, the air segment generates rotation or circulating current in the channels to completely remove adsorbents inside the channels through advancing direction and internal circulation. Meanwhile, the reaction of air segment has a function of removing the adsorbents and restricting generation of adsorbents as well.

Figure 13A:
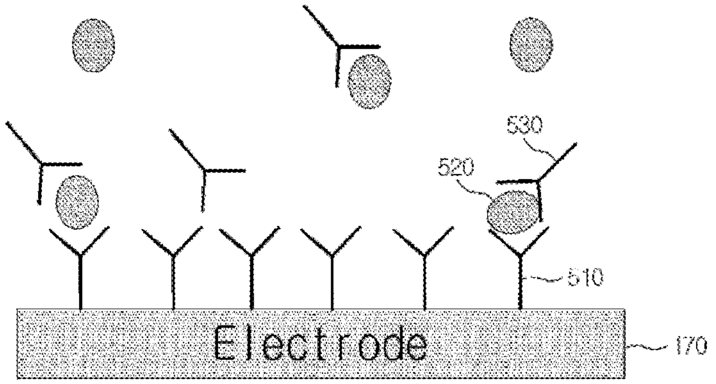
FIGS. 13*a* , 13*b* and 13*c* are schematic conceptual views illustrating a control method for a diagnostic cartridge according to an exemplary embodiment of the present invention.
Figure 13B:
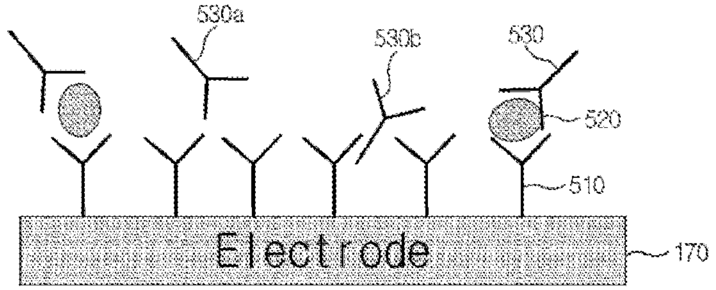
Figure 13C:
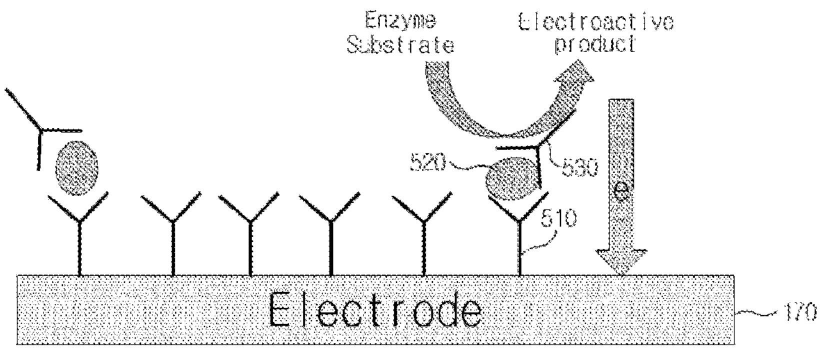

Lastly, FIGS. 13*a*, 13*b* and 13*c* are schematic conceptual views illustrating a control method for a diagnostic cartridge according to an exemplary embodiment of the present invention.

A detecting electrode (170) is formed at a reaction (response) area (K) of the diagnostic cartridge which is a detecting microfluidic device, where the electrode (170) is secured with a first antibody (510).

Under this circumstance, in a case a sample of fluid, in which the antigen (520) and the second antibody (530) are reacted and coupled, flows in the reaction area (K), the antigen (520) is coupled between the first and second antibodies (510, 530) as illustrated in FIG. 13*a*, and captured in an ELISA (Enzyme-linked immunasorbent assay) method.

Thereafter, a substrate solution having air bubbles is injected into the reaction area (K), where a washing process is performed to remove the antigen (520) not coupled to the first antibody (510) and second antibodies (530*a*, 530*b*) (FIG. 13*b*). At this point, the antigen (520) not coupled to the first antibody (510) and second antibodies (530*a*, 530*b*) are ingredients undesirably attached to solution of residual sample.

Successively, air bubble-free substrate solution is injected into the reaction area (K) to allowing reacting with the antigen (520), where the reacted state is electrochemically or optically measured (FIG. 13*c*).

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

As apparent from the foregoing, the diagnostic cartridge and control method for diagnostic cartridge according to the present invention have an industrial applicability in that any further inflow of liquid can be prevented after samples or specimens are completely moved to channels, and in order to control movement of liquid inside a channel, a physical force is applied to easily move the liquid inside the channel to a desired position, whereby reaction can be effectively generated, and nonspecific absorption of protein can be removed or prevented, and an sequential transfer of liquid can be effectively performed inside a channel contained in the diagnostic cartridge.

What is claimed is:

1. A cartridge device for diagnosis, the device comprising:

a first capillary tube configured to transfer a sample, an enzyme conjugated antibody being coated on an inner surface of the first capillary tube;

a first membrane arranged at an end of the first capillary tube;

a first chamber configured to contain a substrate solution;

an air channel tube connected to the first chamber and exposed on an area of the cartridge device;

a third membrane covering the exposed portion of the air channel tube;

a second capillary tube configured to transfer the substrate solution from the first chamber;

a second membrane arranged at an end of the second capillary tube;

a second chamber containing an absorbent pad;

a first channel configured to connect the second membrane and the second chamber;

a second channel configured to connect the first membrane and a portion of the first channel;

an actuator having a sharp end to apply pressure to the third membrane, the third membrane being pierceable by the pressure from the actuator;

a pressure pump connected to an end of the second channel and configured to provide pressure to the second channel; and a vacuum pump connected to the second chamber, wherein the second membrane is positioned higher than the first chamber in the cartridge device, wherein the first membrane is positioned higher than the first capillary tube in the cartridge device, and wherein the first channel and the second channel are positioned lower than the second membrane and the first membrane, respectively.

2. The cartridge device of claim 1, wherein the second channel and the first channel form a T shape at the portion of the first channel.

3. The cartridge device of claim 1, further comprising electrodes, each electrode connected to the first or second channel.

4. The cartridge device of claim 3, wherein the first channel provides at least one of the electrodes with the substrate solution from the second membrane.

5. The cartridge device of claim 3, wherein the second channel provides at least one of the electrodes with the sample from the first membrane.

6. The cartridge device of claim 1, wherein the end of the second channel is opposite to the portion of the first channel.

* * * * *